United States Patent
Ruby et al.

(10) Patent No.: US 7,855,708 B2
(45) Date of Patent: Dec. 21, 2010

(54) LED BACKLIGHT LUMINANCE SENSING FOR LCDS

(75) Inventors: Joseph H. Ruby, Phoenix, AZ (US); Alan S. Feldman, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 1213 days.

(21) Appl. No.: 09/947,094

(22) Filed: Sep. 5, 2001

(65) Prior Publication Data

US 2003/0043107 A1    Mar. 6, 2003

(51) Int. Cl.
G09G 3/36    (2006.01)
G09G 3/32    (2006.01)
(52) U.S. Cl. .......................................... 345/102; 345/82
(58) Field of Classification Search ................. 345/102, 345/76–83, 207, 39, 44–46; 349/61, 62; 315/169.3
See application file for complete search history.

(56) References Cited

U.S. PATENT DOCUMENTS

| | | |
|---|---|---|
| 3,940,756 A | 2/1976 | Findlay |
| 4,573,766 A | 3/1986 | Bournay, Jr. et al. |
| 4,649,381 A | 3/1987 | Masuda et al. |
| 4,714,983 A | 12/1987 | Lang |
| 4,729,185 A | 3/1988 | Baba |
| 4,924,215 A | 5/1990 | Nelson |
| 4,929,062 A | 5/1990 | Guzik et al. |
| 5,046,829 A | 9/1991 | Worp |
| 5,103,328 A | 4/1992 | Numao |
| 5,426,446 A | 6/1995 | Takei et al. |
| 5,621,225 A | 4/1997 | Shieh et al. |
| 5,724,062 A | 3/1998 | Hunter |
| 5,739,545 A | 4/1998 | Guha et al. |
| 5,739,800 A | 4/1998 | Lebby et al. |
| 5,783,909 A | 7/1998 | Hochstein |
| 5,815,228 A | 9/1998 | Flynn |
| 5,861,990 A | 1/1999 | Tedesco |
| 5,923,052 A | 7/1999 | Kim |
| 6,007,209 A | 12/1999 | Pelka |
| 6,329,974 B1 * | 12/2001 | Walker et al. .................. 345/98 |
| 6,344,641 B1 * | 2/2002 | Blalock et al. .............. 250/205 |
| 6,521,879 B1 * | 2/2003 | Rand et al. .................. 250/205 |

(Continued)

FOREIGN PATENT DOCUMENTS

EP    0 363 700 A2    9/1989

(Continued)

Primary Examiner—Jimmy H Nguyen
(74) Attorney, Agent, or Firm—Ingrassia Fisher & Lorenz, P.C.

(57) ABSTRACT

A liquid crystal display (LCD) system having LED backlight luminance sensing is disclosed. An array of LEDs in a backlighting position includes a plurality of LED strings. At least one LED from at least one string is identified as a sampling LED. The light emitted from the sampling LED is detected via an optical path using a light sensor. The reading from the sensor is contrast with a command, which results in a power compensation to the array accordingly. In one embodiment, the system includes a sampling enclosure encasing the sampling LED and light sensor. The sampling LED's direction of emission is altered from the string and reflected from the inside of the enclosure. In another embodiment, the system includes a direct sensing optical path between the light sensor and the sampling LED.

6 Claims, 6 Drawing Sheets

U.S. PATENT DOCUMENTS 6,570,559 B1 * 5/2003 Oshima .................... 345/204
6,707,435 B1 * 3/2004 Merlato et al. ................ 345/39

FOREIGN PATENT DOCUMENTS

| | | | |
|---|---|---|---|
| EP | 0984314 A | 3/2000 | |
| EP | 0997868 A | 5/2000 | |
| EP | 1077444 A | 2/2001 | |
| WO | WO 94/00793 | 3/1993 | |
| WO | WO 95/10066 | 4/1994 | |

* cited by examiner

LED BACKLIGHT LUMINANCE SENSING FOR LCDS

FIELD OF INVENTION

The invention relates to light emitting diodes (LEDs) and more particularly to luminance sensing of LEDs. The invention has particular usefulness in LED backlighting of a liquid crystal display (LCD).

BACKGROUND OF THE INVENTION

Transmissive LCD devices use internally supplied illumination. In a traditional illumination system, one or more light sources, e.g., incandescent or florescent lamps, are placed behind the display, i.e., backlighting the display.

Backlighting LCDs with lamps has several problems. For example, the incandescent lamps can lack uniformity in illumination from localized "hot spots" which reduce the display's readability. In addition, incandescent lamps can be costly to operate. Florescent lamps help to control the energy costs, however, these lamps are subject to the same unevenness in illumination as incandescent lamps.

The illumination or intensity of the light in the backlighting system should remain constant. In the case of lamp systems, a light sensing device is often placed inside the backlighting cavity to detect the systems illumination. In bright light settings, the sensor inside the cavity can falsely perceive some of the light and cause the lamp to reduce luminescence. This effect is opposite of what is desired in this setting. To accurately view the display in bright light, the display should be brighter, not dimmer.

One attempt to overcome the problems with ambient light, involves placing the light sensing device outside the backlight cavity. The length of the fluorescent lamp legs are extended beyond the cavity so luminance can be extraneously monitored. While this sensing technique may reduce the effects of ambient light, the efficiency of the lamp declines because some of the available light is not available to the display. Moreover, placing sensors near the ends of the lamp legs brings them in close proximity to the lamp filaments. The filaments produce a constant infrared radiation which is easily read by the sensors and thus falsifies the "true" luminance of the lamp.

Many displays do not provide for intensity control simply because of the inaccuracies in the previous illumination systems, cost, and size concerns. For instance, laptop computers, cellular telephones, and handheld computing devices typically do not include an intensity control mechanism for the display. The user becomes a slave to the devices external environment. In other words, a visible display indoors is often too dim to be viewed outdoors. Users are forced to find alternative methods to view the display, such as holding their hand over the display to block light.

In some devices, display illumination can be manually controlled. For example, when a moving vehicle enters a tunnel, the operator may be able to manually adjust the intensity of the dashboard lights simply by turning a control. In some situations manually controlling illumination may be an unacceptable task. For instance, in an airplane cockpit there are multiple displays which must be viewable in all lighting conditions. The pilot cannot be bothered with manually setting the display brightness for such highly sensitive information.

Recently, LCD supplemental illumination techniques using light emitting diodes (LEDs) have been introduced. This approach provides a whole array of LEDs instead of one lamp. There are side lighting configurations of LEDs, see e.g., U.S. Pat. No. 5,046,829, as well as "direct view" attempts, see e.g., U.S. patent application Ser. No. 09/384,137 which is incorporated herein by reference. While many of the problems associated with lamp backlighting techniques are eliminated with LED backlightling systems, maintaining constant illumination and providing an accurate luminance sensing technique remains a problem. The '137 application identifies the need for adjusting the illumination intensity of the LED array; however, the large quantity of LEDs employed and the number of unique light sources presents a significant challenge in obtaining accurate light sensing.

Ideally, the light emitted from an LED can be sensed as it is perceived by the viewer. However, placing a sensing device in the direct view of the light would block the light to the display and create a "dark spot" on the display. Alternatively, a sensing device could be mounted on a side panel inside the cavity to avoid blocking the emitted light. This approach is prone to erroneous false readings from direct light similar to the ambient problems previously discussed.

Thus, a luminance sensing technique for LEDs is needed. Moreover, a luminance sensing technique for a desired LED backlit LCD which is reliable and able to maintain a viewable display even under changing ambient lighting conditions in needed.

SUMMARY OF THE INVENTION

The present invention overcomes the prior art problems by providing an LED luminance sensing system substantially impervious to ambient light outside the sensing area. The luminance sensing system according to various aspects of the present invention is particularly useful for monitoring and controlling a matrix of LEDs by detecting light from at least one sampling LED.

In a first aspect of the present invention, a luminance sensing system includes at least one sampling LED taken from a single string of LEDs. The light emitted from the sampling LED is substantially contained within a sampling enclosure where a light sensor detects the light.

In a second aspect of the present invention, a luminance sensing system includes multiple sampling LEDs taken from a single string of LEDs. The light emitted from the sampling LEDs is substantially contained within a sampling enclosure where a light sensor detects the light from all the sampling LEDs.

In a third aspect of the present invention, a luminance sensing system includes multiple sampling LEDs taken from an equal number of strings of LEDs. The light emitted from the sampling LEDs is substantially contained within a sampling enclosure where a light sensor detects the light from all the sampling LEDs.

In a fourth aspect of the present invention, a luminance sensing system includes multiple sampling LEDs taken from a number less than an equal number of strings of LEDs. The light emitted from the sampling LEDs is substantially contained within a sampling enclosure where a light sensor detects the light from all the sampling LEDs.

In a fifth aspect of the present invention, a luminance sensing system includes at least one sampling LED taken from a string of LEDs. The light emitted form the sampling LED is "directly sensed" by a light sensor via a provided optical path.

In a sixth aspect of the present invention, a luminance sensing system includes multiple strings of colored LEDs. At least one sampling LED is taken from each string of varying color. The light emitted from each of the sampling LEDs is substantially contained within a sampling enclosure where a light sensor detects the light from all the sampling LEDs. The sampling LEDs of a single color may be paired with a light sensor and detected.

In a seventh aspect of the present invention, a luminance sensing system includes multiple strings of colored LEDs. At least one sampling LED is taken from each string of varying color. The light emitted from each of the sampling LEDs is directly sensed by a light sensor via a provided optical path.

In an eighth aspect of the present invention, the luminance sensing systems include a feedback control loop circuit. Light readings are compared with a desired level of luminance and circuit commands are generated in response to the comparison.

A luminance sensing method according to various aspects of the present invention provides sensing the illumination of at least one sampling LED and controlling the light intensity of a plurality of LEDs accordingly.

In one embodiment, a luminance sensing method according to the present invention includes enclosing at least one sampling LED to prevent intrusion of ambient light into a light sampling area, and detecting the reflected light from the sampling LED.

In another embodiment, a luminance sensing method according to the present invention includes directly sensing the light emitted from a sampling LED.

In addition, a luminance sensing method according to the present invention, adjusts the intensity of a string of LEDs using a feedback control loop in accordance with the illumination of at least one sampling LED.

BRIEF DESCRIPTION OF THE DRAWINGS

These and other features, aspects and advantages of the present invention will become better understood with reference to the following description, appending claims, and accompanying drawings where:

DETAILED DESCRIPTION

The present invention provides a luminance sensing system and technique for LED applications. While conveniently described in connection with a LCD system having LED backlighting, the invention is not so limited. Any LED application having a need to monitor and control the light intensity may equally benefit from this invention. Moreover, the present invention shows particular usefulness in the airline industry in connection with LCD cockpit panels. Again, the invention is not so limited. Generally, various other display systems where less expensive alternatives and display luminance sensing is needed may be well suited for the present invention, for example, automotive dash displays, medical monitors, stock trading monitors, TV studio production, and military vehicle situation displays, to name a few.

Figure 1:
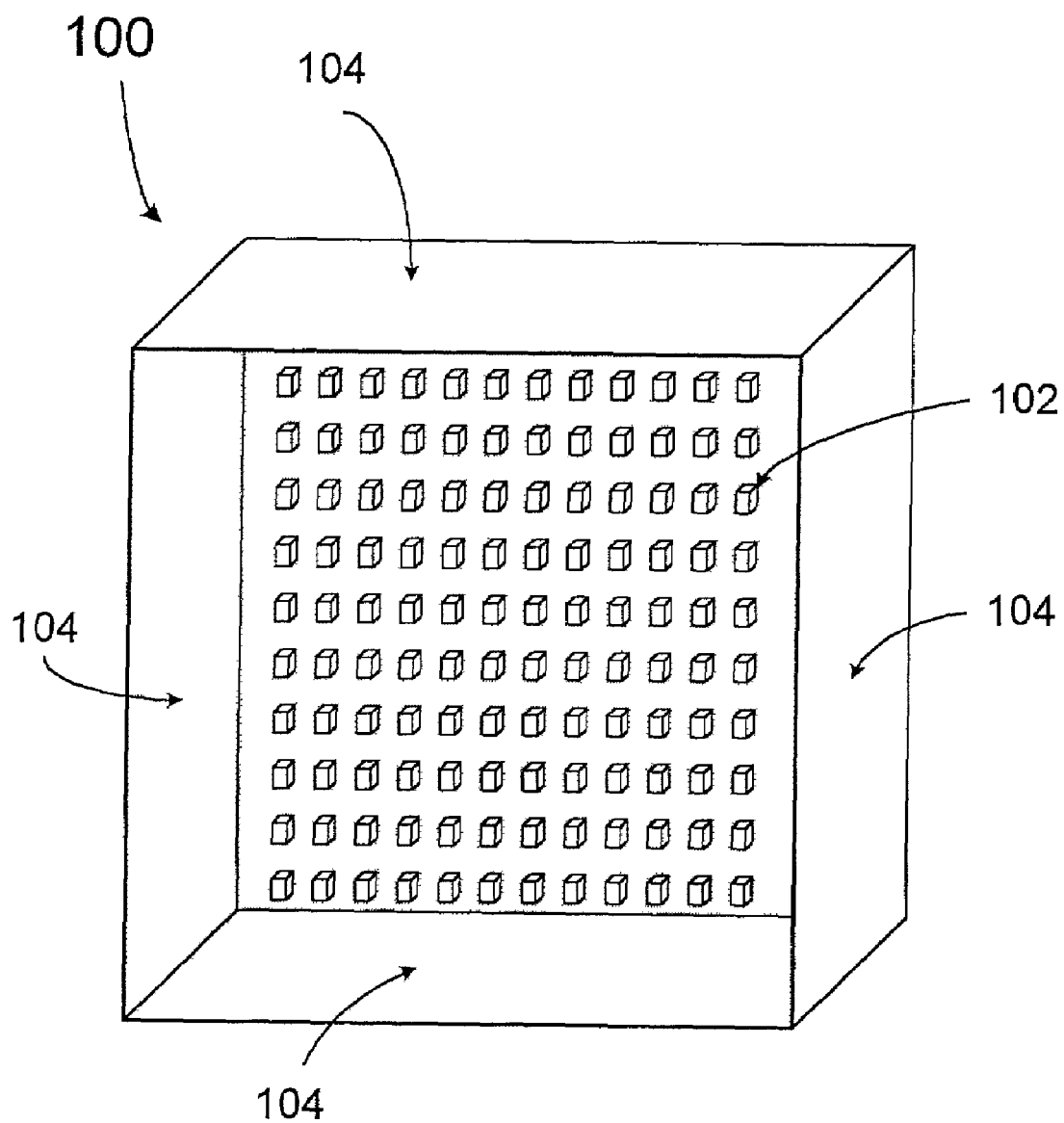
FIG. 1 illustrates an exemplary LED illumination source in a LCD system.

FIG. 1 illustrates a cut-away view of a backlighting system 100 for use in, for example, backlighting a flat panel LCD (liquid crystal display) system (LCD not shown). An example of a suitable flat panel LCD having a LED illumination source is disclosed in U.S. patent application Ser. No. 09/384,137, which is incorporated herein by reference. Backlighting system 100 includes any number of rows and columns of LEDs (light emitting diodes) 102. As shown, system 100 includes a 10×12 matrix of LEDs 102; however, it should be appreciated that any number of LEDs may be provided to form the matrix. The LEDs are encased in a cavity preferably formed by connecting walls 104. The cavity may be referred to as the "backlight cavity". Preferably, walls 104 are coated with a highly light-reflective finish, for example, a high-gloss white paint or white reflective material. Although not shown in FIG. 1, it should be realized that "side-lit" or "edge-lit" applications may include LEDs on one or more of walls 104.

LEDs, whether surface-mounted or through-hole, are current controlled devices whereby each of the LEDs in a string receive the same current. It is common to electrically "string" LEDs in a series connection to, among other reasons, conserve power. Multiple strings of LEDs may be used in an application to increase illumination, avoid higher voltage levels, increase the safety margin in the event of LED failure, and accommodate LEDs of various colors if color enhancement or color generation is desired.

Figure 2:
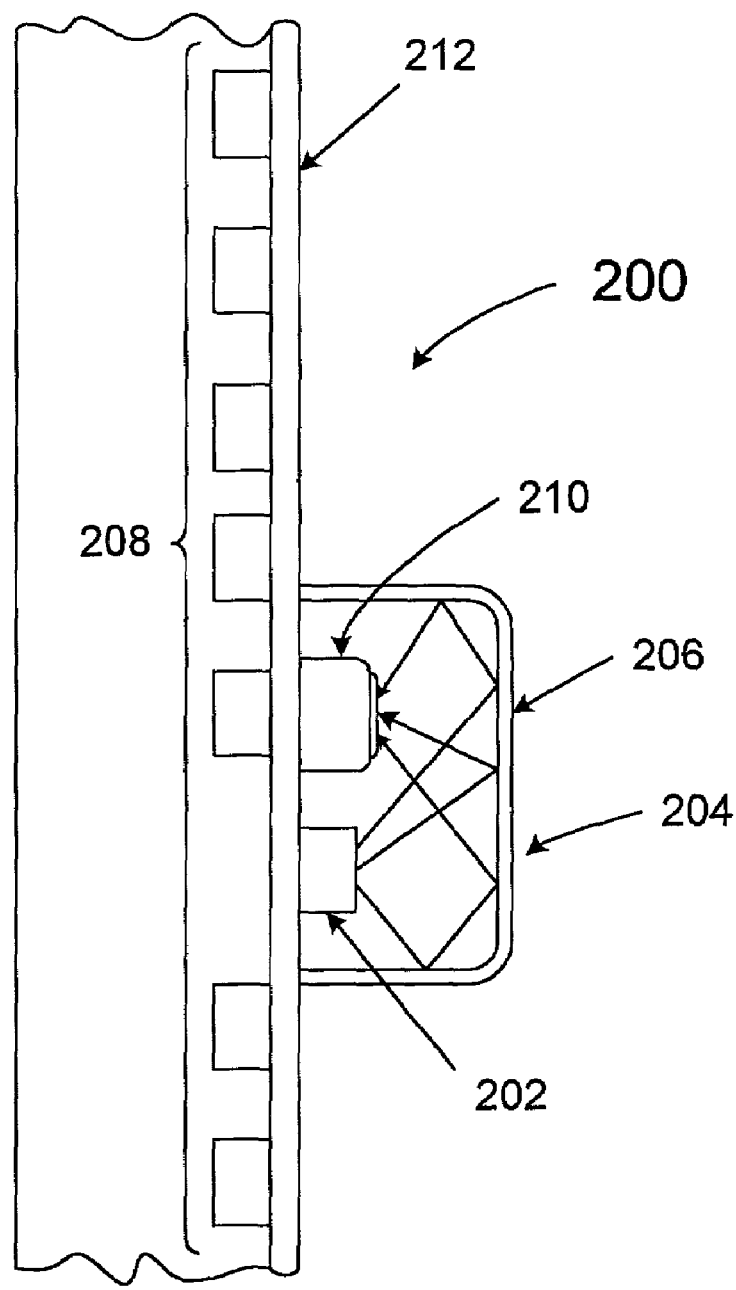
FIGS. 2-4 and 6 illustrate LED luminance sensing systems in accordance with various embodiments of the present invention.

FIG. 2 illustrates a luminance sensing system 200 for use in a LED backlight scheme according to one embodiment of the present invention. System 200 includes at least one sampling LED 202 taken from a LED string 208, and a sampling enclosure 204. The primary direction of light emission from the sampling LED, i.e., LED 202, is altered from the remaining LEDs of string 208. In this embodiment, LED 202 is "pulled through" a backplate 212 thereby changing the direction of light emission nearly 1800. The electrical connection of the string is maintained so that the sampling LED is receiving the same current as the remaining LEDs in the string. In this manner, the illumination of the sampling LED is substantially identical to each of the other LEDs in the string. Thus, by measuring the luminance of at least one LED in a string, i.e., the sampling LED, an accurate approximation of the luminance of the entire string can be obtained without substantial light loss.

The light emitted from sampling LED 202 is suitably contained within sampling enclosure 204 thus preventing ambient light (or other "falsifying" light) from disrupting the reading. Sampling enclosure 204 includes a cover 206 and a light sensor 210. Cover 206 may include any lightweight material commonly used in LCD systems, such as lightweight metal (i.e., aluminum), graphite, and plastic. Preferably, the internal surface of cover 206 is a reflective surface and may be coated with a reflective material, such as DURAFLEC™. In this manner, optical paths may be formed between sampling LED 202 and light sensor 210 to include all light within the enclosure, e.g., reflected light and direct light.

In this embodiment, one side or wall of sampling enclosure 204 is formed by backplate 212. Preferably this side of backplate 212 is coated with a reflective material in a similar manner as just described. Backplate 212 may include a lightweight metal material commonly used in LCD systems, e.g., aluminum. In addition, the backplate is generally in close proximity to the LCD backlighting, thus it is often desirable to use a material which can aid in the transfer of heat from the display. Backplate 212 may further include a printed circuit board ("PCB") which provides the connection or bond pads to interconnect the rows and columns of LEDs. In this manner, the LEDs are typically adhered, mounted, or placed in the PCB.

Light sensor 210 is suitably mounted to backplate 212 within sampling enclosure 204. Light sensor 210 may include any suitable light detection device, such as a phototransistor or a photodiode. Light reflected from the inside walls of sampling enclosure 204 (to include backplate 212) is detected by light sensor 210. Light sensor 210 is suitably coupled to a feedback control loop (i.e., "decision" circuit) to increase, decrease, or simply monitor the illumination of the system. This function is discussed in more detail below.

Figure 3:
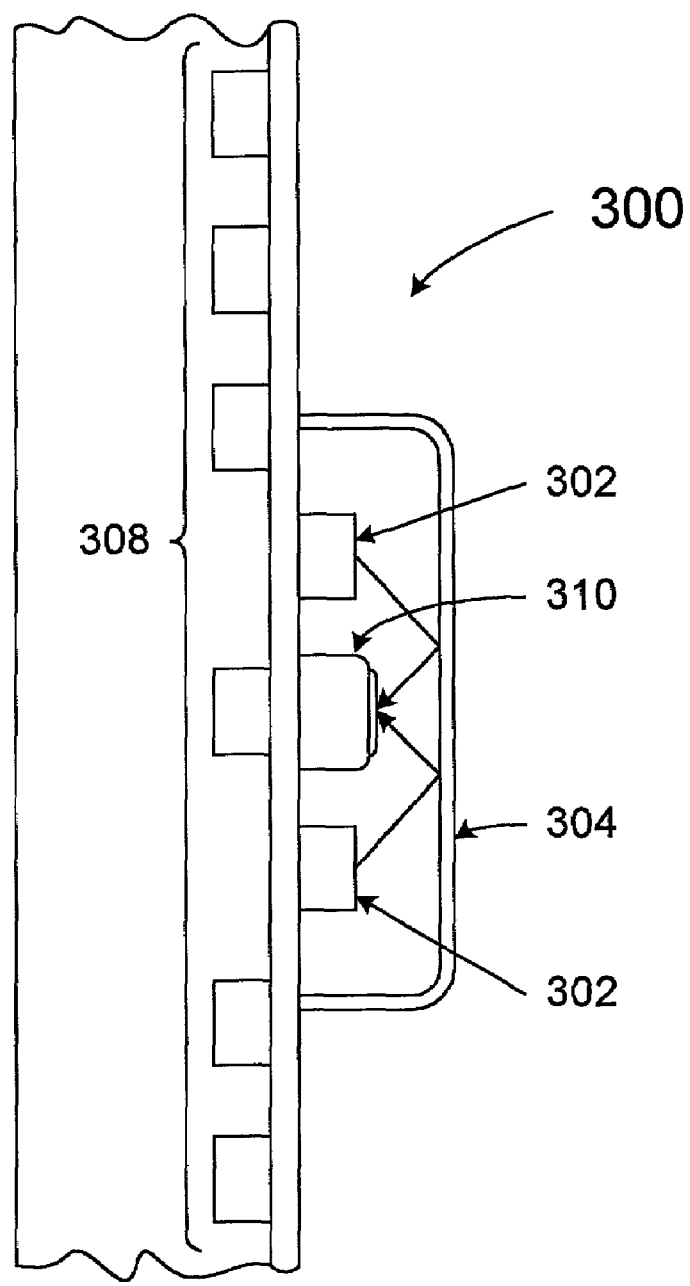

FIG. 3 illustrates a luminance sensing system 300 for use in a LED backlight scheme according to another embodiment of the present invention. System 300 includes multiple sampling LEDs 302 taken from a single LED string 308, and a sampling enclosure 304. LEDs 302 and sampling enclosure 304 (including light sensor 310) are similar to previously described LED 202 and sampling enclosure 204 and thus their structure and function will not be entirely repeated. The direction of light emission from sampling LEDs 302 is altered from the string in a similar manner as previously described for system 200. In this embodiment, however, a single light sensor 310 detects reflected light from more than one sampling LED, i.e., LEDs 302. In this manner, the analog light readings can be averaged (i.e., added and divided by the number of sampling LEDs) in the feedback control loop. In some instances, the averaged illumination may be desirable over a single LED light sensor reading. For example, the averaged illumination embodiment can account for failing or dimming LEDs and may be more economical by using less area in the sampling enclosure (a single light sensor for multiple LEDs).

Figure 4:
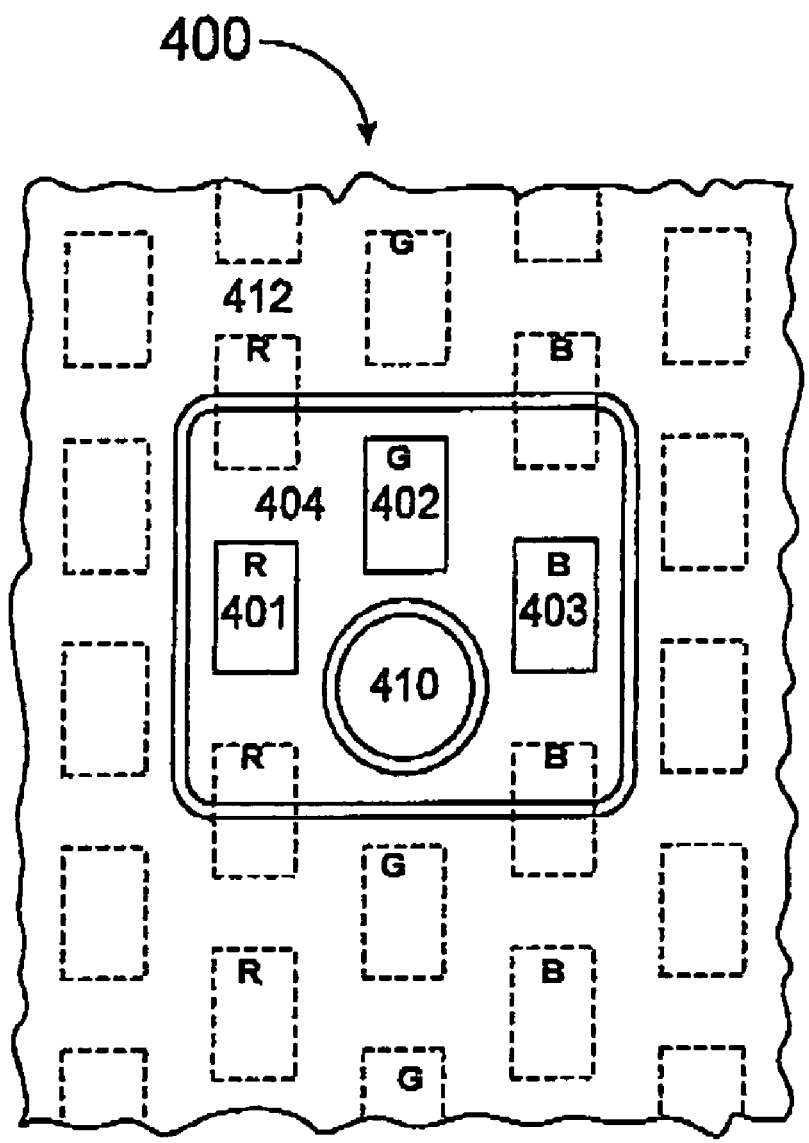

FIG. 4 illustrates a luminance sensing system 400 for use in a LED backlight scheme according to yet another embodiment of the present invention. System 400 includes multiple sampling LEDs 401-403 taken from multiple LED strings (shown in phantom), and a sampling enclosure 404. LEDs 401-403 and sampling enclosure 404 (including light sensor 410) are similar to previously described LED 202 and sampling enclosure 204 and thus their structure and function will not be repeated entirely. In this embodiment, however, a single light sensor 410 detects reflected light from sampling LEDs taken from more than one LED string. For instance, at least one sampling LED from a first string is altered in a manner as previously described, and at least one sampling LED from a second string is altered, such that all the sampling LEDs are contained within a single sampling enclosure having a single light sensor. Sampling LEDs 401, 402 and 403 are from different LED strings but are contained within the same sampling enclosure 404. Light sensor 410 detects the reflected light from each of the sampling LEDs. In a similar manner as previously discussed, the analog readings from the multiple sampling LEDs can be averaged by the feedback control loop. This technique accounts for slight variations in luminescence between strings of LEDs, occurring due to more or less power delivered to a string and LED dimming. Additionally, in the event of an entire string failure, the detected light in the sampling enclosure would decrease, which in turn would result in the feedback control loop increasing the power to the remaining strings to compensate.

Although not depicted in an illustration, it should be appreciated that another embodiment of the invention includes multiple sampling LEDs taken from less than an equal number of strings. For example, a combination of system 300 (i.e., multiple sampling LEDs taken from the same string) with system 400 (i.e., multiple sampling LEDs taken from different stings) may include, for example, three sampling LEDs taken from two strings. In this manner, two of the sampling LEDs are taken from a first string of LEDs and a third LED is taken from a second string and all sampling LEDs are within the same sampling enclosure. A single light sensor detects the reflected light from all the sampling LEDs and forwards the readings to the feedback control loop. It should be realized that the above example is provided merely to further the understanding of the present embodiment and is not intended to be limiting. In fact, there are far too many arrangements of one or more sampling LEDs taken from the same or multiple strings to list herein which fall within the spirit and scope of the present invention.

Figure 5:
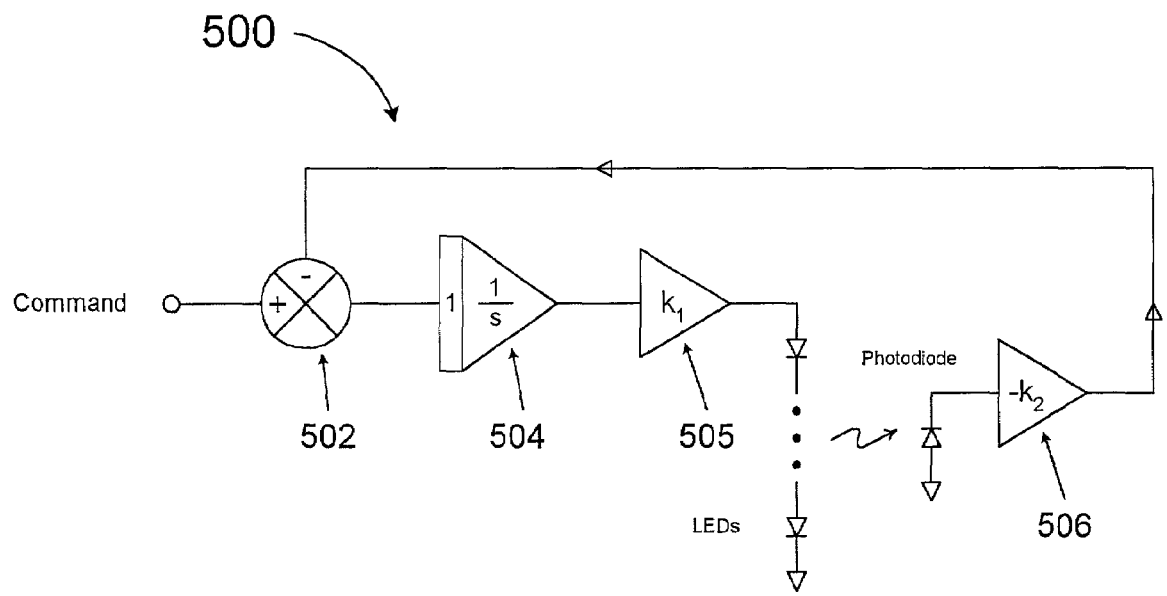
FIG. 5 illustrates an exemplary feedback control loop circuit in accordance with one embodiment of the present invention.

Referring now to FIG. 5, an exemplary feedback control loop circuit 500 in accordance with the present invention is illustrated. The function of a feedback control loop is widely known in the electrical industry. There are numerous circuit configurations which can provide feedback control to a device. Control loop 500 is in no way intended to be limiting, but rather is provided merely as exemplary of a contemplated configuration in the spirit of the best mode.

Control loop 500 includes a summer 502, an integrator 504, and converters 505 and 506. In this embodiment, a reference or set command is provided to summer 502. The command may be, for example, a desired level of display luminescence and may be generated by a manual control setting or a processing means. Summer 502 also receives a reading from the light sensor in accordance with the present invention. The summer suitably contrasts the command with the reading. In the event that the reading is higher or lower than the command, the control loop compensates the power to the LED accordingly.

Systematically, summer 502 and integrator 504 may be one component or combination of components, but functionally, the two are different. Integrator 504 is provided to avoid "hunting" or changing the power level constantly. The two functions may be represented together by an operational amplifier and a capacitor. There are various other combinations of components which will work suitably well in place of summer 502 and integrator 504 which fall within the scope of the present invention.

Converters 505 and 506 suitably convert voltage to current and vice versa, respectively. As is well known, LEDs are current controlled devices and thus the converters are included to provide current to the LEDs and convert received current from the light sensor to voltage. Converters 505 and 506 may include any suitable device capable of functioning in the above-intended way, such as transconductance and transimpedance amplifiers, respectively.

Figure 6:
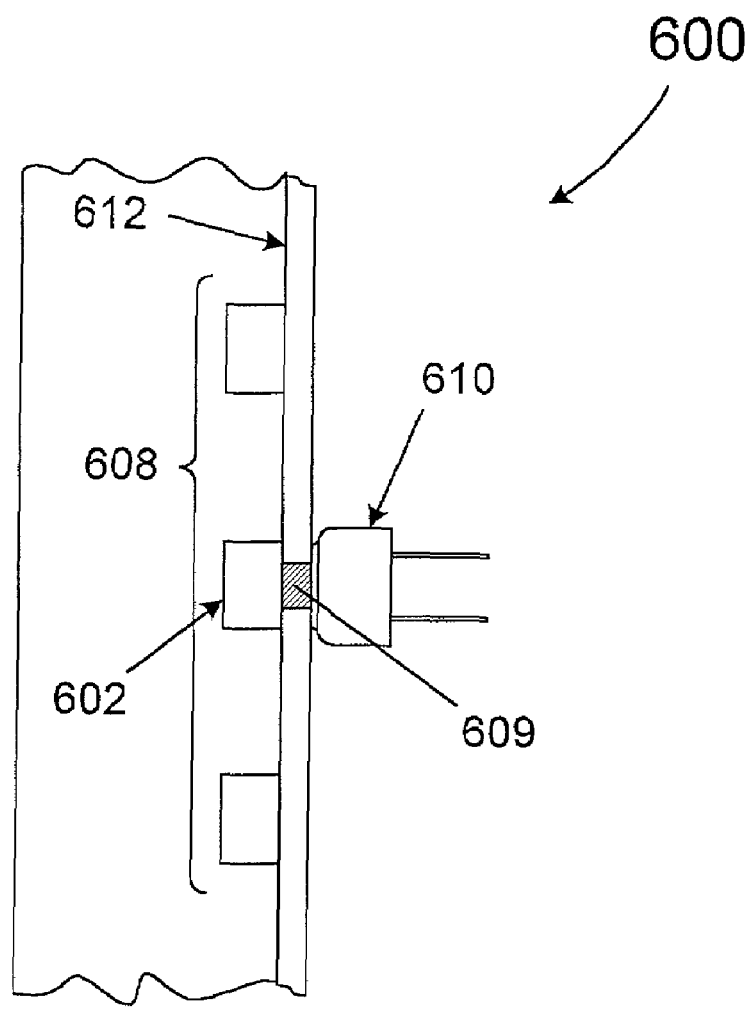

FIG. 6 illustrates a luminance sensing system 600 for use in a LED backlight scheme according to another embodiment of the present invention. System 600 includes at least one sampling LED 602 taken from a string of LEDs 608 attached to a backplate 612 and a light sensor 610. System 600 functions substantially the same as previously described systems 200-400, except that system 600 does not include a sampling enclosure and the direction of light emission from the sampling LEDs is not altered from their string. LEDs are capable of light emission from virtually each surface; therefore, the sampling LEDs can emit light into sampling areas substantially surrounding the LED and is generally limited only by intended light barriers. This allows for a "direct sensing" of the sampling LED without having to alter the direction of light emission.

In this embodiment, a small aperture 609 placed in backplate 612 provides an optical path from sampling LED 602 to light sensor 610. Aperture 609 may be formed by drilling through the backplate in a conventional manner. Preferably, aperture 609 is sized to prevent ambient light from interfering with the "true" reading of the sampling LED, i.e., avoid ambient or surrounding light from being detected by light sensor 610. The light emitted from the sampling LED is directed in the same direction as the string. In this manner, the light from the sampling LED is "directly sensed" by the light sensor and not reflected prior to detection.

System 600, similar to systems 200 and 400, directly pair each sampling LED with a light sensor. Multiple sampling LEDs from single or multiple strings of LEDs can be monitored by an equal number of light sensors. For instance, if color generation is desired, LEDs of various colors may be used. A first string of red LEDs, a second string of blue LEDs, and a third string of green LEDs may be used (of course, multiple strings of each color are typically used to provide enough light intensity). A sampling LED from at least one of each string of varying color can be monitored by any of the techniques previously described, i.e., sampling enclosure or direct sensing. However, preferably, each sampling LED (or multiple sampling LEDs if more than one from a single color is used) is paired with a light sensor. The individual readings can be summed for "white light" or analyzed individually to enhance certain colors.

It should be noted that when sensing multiple colored LEDs, it may be desirable to measure the individual color illuminations prior to combining the lights to avoid the effects of chromatic lag (i.e., colors of varying frequencies travel at different speeds). In white light analysis, this factor can increase the amount of feedback circuitry needed to ascertain the various colors, but this may be averted by monitoring each color prior to combining to form white light.

For the sake of brevity, conventional techniques for signal processing, data transmission, signaling, control, mounting and interconnection (of the LEDs and light sensor, for example), and other functional aspects of the systems (and components) are not included. Furthermore, the connecting lines shown in the Figures (e.g., FIG. 5) are intended to represent exemplary functional relationships and/or physical couplings between the various elements. It should be noted that many alternative or additional functional relationships or physical connections may be present in a practical display system.

It should be appreciated that the particular implementations shown and described herein are illustrative of various embodiments of the invention including its best mode, and are not intended to limit the scope of the present invention in any way. For instance, while conveniently described with only a few sampling LEDs, various other embodiments and combinations of sampling LEDs and strings are intended to be within the scope of the invention. In addition, the direction of light emission from the sampling LED(s) may or may not be altered. In those instances where the direction of light emission of the sampling LED is altered, embodiments herein have been conveniently depicted as illustrating the primary light direction of sampling LED as being nearly 180° from the remaining LEDs of the string. It should be appreciated, however, that the direction of emission is not limited to 180°, but rather, may be any suitable altering direction. These and other changes or modifications are intended to be included within the scope of the present invention, as expressed in the following claims.

The invention claimed is:

1. A light emitting diode (LED) luminance sensing system comprising:
    an LED mount structure having a first side and a second side;
    an aperture extending through the LED mount structure between the first side and the second side to define an optical path having a first end and a second end;
    a string of LEDs mounted on the LED mount structure first side, the string of LEDs including a sampling LED and configured to receive a current flow and, upon receipt thereof, to emit light, the sampling LED disposed directly over the first end of the aperture and entirely covering the first end of the aperture;
    a light sensor disposed adjacent the mount structure second side, the light sensor disposed directly over the second end of the aperture and entirely covering the second end of the aperture so that only light emitted from the sampling LED is detected by the light sensor; and
    a control mechanism in communication with the light sensor and configured to adjust the current flow to the string of LEDs in accordance with the light detected by said light sensor.

2. The LED luminance sensing system of claim 1, wherein said control mechanism configured to receive a reference point and to compare said reference point with said light detected by said light sensor to determine whether to increase or decrease the current flow to said string.

3. The LED luminance sensing system of claim 1, further comprising a second sampling LED from said string.

4. The LED luminance sensing system of claim 1, further comprising a plurality of strings wherein some of said strings have a sampling LED.

5. The LED luminance sensing system of claim 4, comprising a string of red LEDs, a string of blue LEDs, and a string of green LEDs.

6. The LED luminance sensing system of claim 5, comprising a sampling LED from said string of red LEDs, a sampling LED from said string of blue LEDs, and a sampling LED from said string of green LEDs.

* * * * *